(12) United States Patent
Arimilli et al.

(10) Patent No.: US 6,874,063 B1
(45) Date of Patent: Mar. 29, 2005

(54) SYSTEM BUS READ DATA TRANSFERS WITH DATA ORDERING CONTROL BITS

(75) Inventors: Ravi Kumar Arimilli, Austin, TX (US); Vicente Enrique Chung, Austin, TX (US); Guy Lynn Guthrie, Austin, TX (US); Jody Bern Joyner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,421

(22) Filed: Nov. 9, 1999

(51) Int. Cl.[7] .............................................. G06F 12/00
(52) U.S. Cl. ....................... 711/118; 711/128; 711/144
(58) Field of Search ............................... 711/118, 128, 711/144, 3, 100; 710/66, 65, 1

(56) References Cited

U.S. PATENT DOCUMENTS

| | | | | |
|---|---|---|---|---|
| 4,520,439 A | * | 5/1985 | Liepa | 71/201 |
| 4,975,830 A | * | 12/1990 | Gerpheide | 709/228 |
| 5,491,811 A | * | 2/1996 | Arimilli | 711/144 |
| 5,519,842 A | * | 5/1996 | Atallah et al. | 711/202 |
| 5,572,713 A | * | 11/1996 | Weber et al. | 703/27 |
| 5,721,957 A | * | 2/1998 | Huang et al. | 710/66 |
| 5,781,923 A | * | 7/1998 | Hunt | 711/128 |
| 5,835,929 A | * | 11/1998 | Gaskins et al. | 711/3 |
| 5,848,436 A | | 12/1998 | Sartorius et al. | |
| 5,867,690 A | * | 2/1999 | Lee | 710/65 |
| 5,978,841 A | | 11/1999 | Berger | |
| 6,085,289 A | * | 7/2000 | Thatcher et al. | 711/118 |
| 6,175,942 B1 | * | 1/2001 | Pawlowski | 714/763 |
| 6,199,118 B1 | * | 3/2001 | Chin et al. | 710/1 |

OTHER PUBLICATIONS

U.S. Appl. No. 09/436,419, filed Nov. 9, 1999, Ravi K. Arimilli, et al., Related Co–Pending Application.
U.S. Appl. No. 09/436,420, filed Nov. 9, 1999, Arimilli et al., Related Co–Pending Application.
U.S. Appl. No. 09/436,422, filed Nov. 9, 1999, Arimilli et al., Related Co–Pending Application.

* cited by examiner

*Primary Examiner*—Kimberly Mclean-Mayo
(74) *Attorney, Agent, or Firm*—Casimer K. Salys; Dillon & Yudell LLP (57) ABSTRACT

A method for informing a processor of a selected order of transmission of data to the processor. The method comprises the steps of coupling system components via a data bus to the processor to effectuate data transfer, determining at the system component logic the order in which to transmit data to the processor, and issuing to the data bus a selected order bit concurrent with the data, wherein the selected order bit alerts the processor of the order and the data is transmitted in that order. In a preferred embodiment, the system component is the cache and the method may involve receiving at the cache a preference of ordering for a read address/request from the processor. The preference order logic of the cache controller or a preference order logic component evaluates the preference of ordering desired by comparing the processor preference with other preferences, including cache order preference. One preference order is selected and the data is then retrieved from a cache line of the cache in the order selected.

4 Claims, 5 Drawing Sheets

| 000 | PREF 1 |
| --- | --- |
| 001 | PREF 2 |
| 010 | PREF 3 |
| 011 | PREF 4 |
| 1xx | MULTIPLE PREF |

SYSTEM BUS READ DATA TRANSFERS WITH DATA ORDERING CONTROL BITS

The present invention is related to the subject matter of the following commonly assigned, copending United States patent applications filed concurrently herewith: Ser. No. 09/436,419 entitled "System Bus Read Address Operations With Data Ordering Preference Hint Bits"; Ser. No. 09/436,420 entitled "System Bus Read Address Operations With Data Ordering Preference Hint Bits for Vertical Caches"; Ser. No. 09/436,422 entitled "System Bus Read Data Transfers With Bus Utilization Based Data Ordering". The content of the above-referenced applications is incorporated herein by reference.

BACKGROUND OF THE INVENTION

1. Technical Field

The present invention relates in general to data processing systems and in particular to a method and system for transmitting data in a selected (preferred) order. Still more particularly, the present invention relates to a method and system for transmitting data in a selected order wherein the order selected is encoded in selected order bits and transmitted via the data bus concurrently with the data.

2. Description of the Related Art

In conventional symmetric multiprocessor (SMP) data processing systems, all of the processors are generally identical. The processors all utilize common instruction sets and communication protocols, have similar hardware architectures, and are generally provided with similar memory hierarchies. For example, a conventional SMP data processing system may comprise a memory, a plurality of processing elements that each include a processor and one or more levels of cache memory and a system bus coupling the processing elements to each other and to the system memory.

Conventional SMP data processing system processors have a number of execution units. Superscalar multiprocessors typically have more than one of each execution unit. They typically have two floating point units (FPUs), two fixed point units (FXUs) and two load/store units (LSUs). The processors are designed for high frequency and their corresponding internal caches are typically very small in order to operate with the high frequency processor. In part due to their relatively small size, these internal caches sustain a large number of cache misses during requests for data. Data is thus stored in lower level (L2 or L3, etc.) caches to maximize processing speed. The processors typically send multiple load requests simultaneously or within close proximity to each other. This is particularly true in superscalar processors with multiple LSUs.

A typical cache memory, for example, stores the contents of frequently accessed random access memory (RAM) locations and the addresses where these data items are stored. When the microprocessor references an address in memory, the cache memory checks to see whether it holds that address. If the cache memory does hold the address, the data is returned to the microprocessor; if it does not, a regular memory access occurs.

In an SMP system with processors running at very high frequencies, system performance can be highly sensitive to main memory latency. One method to reduce latency is to use an L3 cache which may be shared by multiple CPUs in the system. Since many of today's CPUs have fairly large L2 caches, the shared (L3 cache) must be very large to have a marked impact on system performance.

In order to increase the speed of access to data stored within the main memory, modern data-processing systems generally maintain the most recently used data in the cache memory. The cache memory has multiple cache lines, with several bytes per cache line for storing information in contiguous addresses within the main memory. Each cache line essentially comprises a boundary between blocks of storage that map to a specific area in the cache memory or high-speed buffer. In addition, each cache line has an associated "tag" that typically identifies a partial address of a corresponding page of the main memory. Because the information within cache may come from different pages of the main memory, the tag provides a convenient way to identify which page of the main memory a cache line belongs.

In a typical cache memory implementation, information is stored in one or several memory arrays. In addition, the corresponding tags for each cache line are stored in a structure known as a directory or tag array. Usually, an additional structure, called a translation lookaside buffer (TLB), is also utilized to facilitate the translation of a virtual address to a real address during a cache memory access. Cache memory access thus involves reading out a line of the cache and its associated tag. The real address from a translation array is then compared with the real address from the tag array. If these real addresses are identical, then the line in the cache that was read out is the desired line, based on the effective or virtual address calculated by the algorithm in use.

As indicated above, data stored in a data cache or memory are stored on cache lines. A typical cache line for example, may 64 bytes and represented in eight 8×8 byte partial cache lines (i.e., 8 beats of 8 bytes).

An exemplary cache line (block) includes an address tag field, a state bit field, an inclusivity bit field, and a value field for storing the actual instruction or data. The state bit field and inclusivity bit fields are used to maintain cache coherency in a multi-processor computer system (indicate the validity of the value stored in the cache). The address tag is a subset of the full address of the corresponding memory block. A compare match of an incoming address with one of the tags within the address tag field indicates a cache "hit." The collection of all of the address tags in a cache (and sometimes the state bit and inclusivity bit fields) is referred to as a directory, and the collection of all of the value fields is the cache entry array.

In order to access a byte in a cache memory with an effective or virtual address, the line portion (mid-order bits) of the effective or virtual address is utilized to select a cache line from the memory array, along with a corresponding tag from the directory or tag array. The byte portion (low-order bits) of the effective or virtual address is then utilized to choose the indicated byte from the selected cache line. At the same time, the page portion (high-order bits) of the effective address is translated via the segment register or segment lookaside buffer and TLB to determine a real page number. If the real page number obtained by this translation matches the real address tag stored within the directory, then the data read from the selected cache line is the data actually sought by the program. If the real address tag and translated real page number do not agree, a cache "miss" occurs, meaning that the requested data was not stored in the cache memory. Accordingly, the requested data must be from the main memory or elsewhere within the memory hierarchy.

Both address translation and cache access involve comparison of a value read from one array with another value read from a different array. In the case of address translation, the virtual segment-identifier associated with a given effective address and stored in a segment register or segment lookaside buffer is compared with the virtual address stored as part of an entry in the translation lookaside buffer. Similarly, the translated real page number is compared with the real page number read from the cache tag array to determine whether the accessed line in the cache is the required real page number.

As the need for processor efficiency increases, the retrieval order of data from cache lines becomes increasingly important. Cache lines typically contain several data values stored as words, double words, octa-words, etc. Particular data values within a cache line may be considered critical (i.e., more important to processing efficiency than the other values or desired to be retrieved in a particular order) by a processor. Cache access and data retrieval is initiated with processor load requests which are transmitted from the processor to the L1 cache first.

Load requests are comprised primarily of read addresses, which identify a location of the required data. When a read address misses on the internal memory caches (L1), they are sent over the system bus to the lower level caches (L2, L3, etc.). The addresses are sent over the system buses as snoop requests. These snoop requests are broadcasted over the system bus to every component which is connected to the system bus. The components which actively snoop the system bus, particularly the lower level caches, look up in their cache directory to see if the requested is present in the cache. When the address is matched within the cache directory, the data is transmitted cache-to-cache over the data bus (referred to as intervention). During prior art data retrieval ordering schemes, the data was usually extracted sequentially (beat 0 through beat 7). Thus, a critical block (word) is transmitted only at the place it occurs in the particular sequence in the cache line.

Address-based ordering schemes are common in the industry. These "pre-set" ordering schemes are vendor specific and are static (i.e., cannot be adjusted after the system is manufactured) based on the lower address bits. Thus, in some cases, system buses and caches are designed with a set implied ordering. Two common types of ordering schemes are the International Business Machines (IBM) sequential ordering scheme, and the Intel $2^N$ ordering scheme. Once the read address matches the address of the cache line, the system ordering scheme forces the requested data to be retrieved from the cache line and transmitted to the processor in the pre-set order.

Thus in present systems, the processor has no way of changing the pre-defined address-based order for data retrieval from the cache line to maximize processor efficiency. As an example, a processor may prefer a different instruction cache reload order than a data cache reload order. The pre-set retrieval scheme dictates the order utilized at every data request. However, the various components involved in data retrieval and transmission may have preferences which lead to better component or system efficiency. These preferences may result in system-wide or component-based optimization. For example, the cache may also have a desired method of issuing data from its cache lines which would lead to more, efficient overall cache access. Thus hardware design limitations exist in the method of requesting and retrieving data from a data cache line.

As technology becomes increasingly advanced, the need arises for microprocessors that are able to more accurately and efficiently access lower level caches and extract critical data from cache lines in an order preferred by the processor and/or system components. Currently there is no way for changing the order of the system to permit the processor to order data retrieval based on system preferences or to improve system efficiency.

The present invention recognizes that it would therefore be desirable to provide a method and system for enabling a dynamic ordering of retrieval and transmission of data. It would be further advantageous to provide a method and system by which a system component (i.e., data cache, system memory or input/output (I/O)) may notify a data requestor, such as a processor, via the data bus, of an exact order of delivery of said data. It would also be desirable for the system components to implement a dynamic non-fixed data retrieval ordering system whereby an order of data retrieval is selected from a plurality of possible orders based on an optimization determination of the system and system components.

SUMMARY OF THE INVENTION

It is therefore one object of the present invention to provide an improved data processing system.

It is another object of the present invention to provide an improved method and system for transmitting data within a data processing system.

It is yet another object of the present invention to provide an improved method and system for transmitting data within a data processing system, wherein the selected order of the data is sent as encoded bits to the processor concurrently with the data via the data bus.

The foregoing objects are achieved as is now described. A method for informing a processor of a selected order of transmission of data to the processor is disclosed. The method comprises the steps of coupling system components via a data bus to the processor to effectuate data transfer, determining at the system component logic the order in which to transmit data to the processor, and issuing to the data bus a selected order bit concurrent with the data, wherein the selected order bit alerts the processor of the order and the data is transmitted in that order.

In a preferred embodiment, the system component is the cache and the method may involve receiving at the cache a preference of ordering for a read address/request from the processor. The preference order logic of the cache controller or a preference order logic component evaluates the preference of ordering desired by comparing the processor preference with other preferences, including cache order preference. One preference order is selected and the data is then retrieved from a cache line of the cache in the order selected.

The above as well as additional objects, features, and advantages of an illustrative embodiment will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
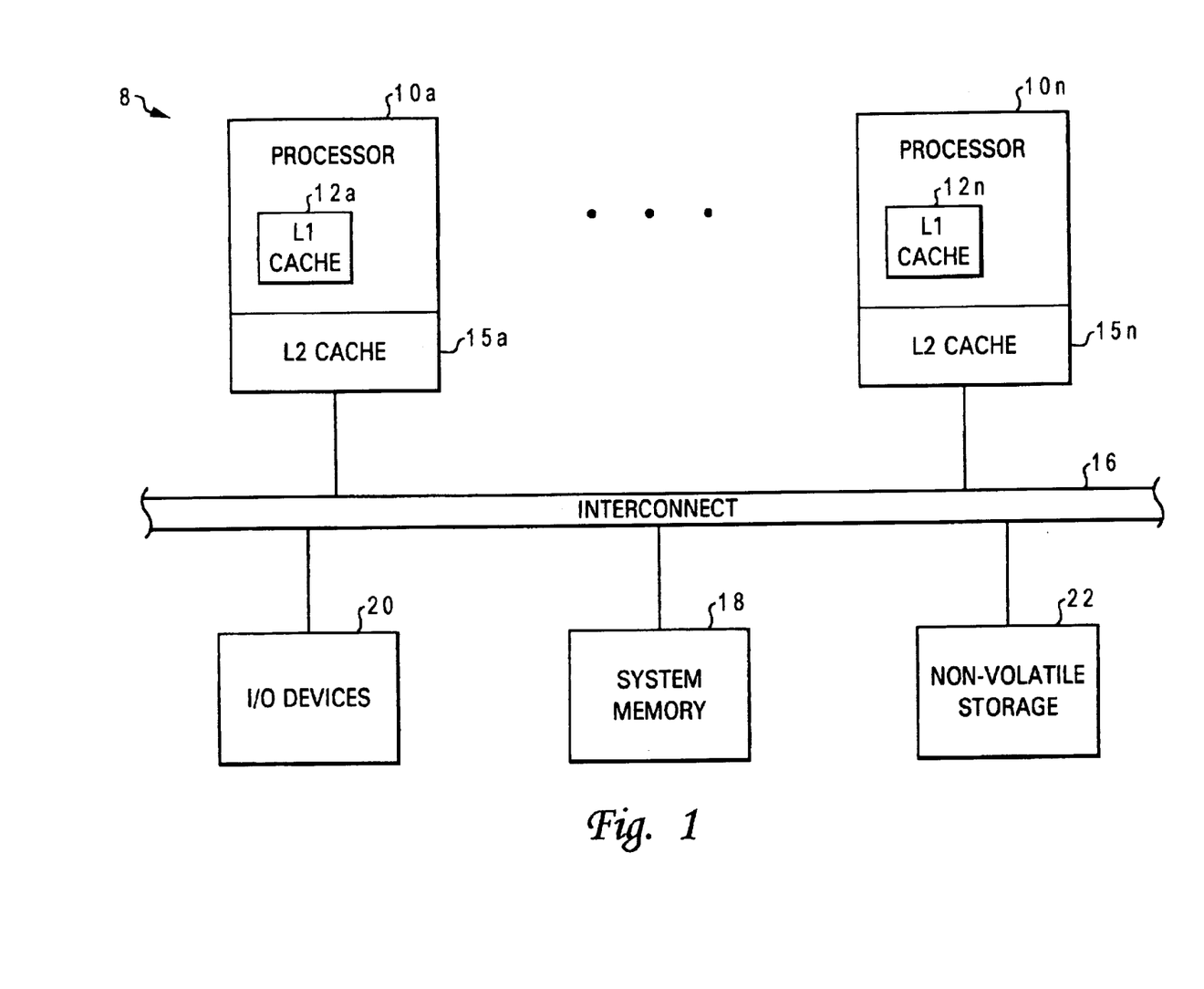
FIG. 1 depicts a high level block diagram of a multiprocessor data processing system utilized in accordance with the present invention.

With reference now to the figures, and in particular with reference to FIG. 1, there is illustrated a high level block diagram of a multiprocessor data processing system in accordance with the present invention. As depicted, data processing system 8 includes a number of processors 10a–10n. Processors 10a–10n preferably comprise one of the PowerPC™ line of microprocessors available from International Business Machines Corporation. Those skilled in the art will appreciate that other suitable processors can be utilized. In addition to the conventional registers, instruction flow logic and execution units utilized to execute program instructions, each of processors 10a–10n also include an associated on-board level one (L1) data caches 12a–12n, which temporarily holds data that is likely to be accessed by the associated processor.

In order to minimize latency, data processing system 8 may also include one or more additional lower levels of cache, such as level two (L2) caches 15a–15n or level three (L3) caches (not shown). L2 caches 15a–15n are depicted as off-chip although it is conceivable that they may be on-chip with L1 caches 12a–12n. Also, the L2 caches 15a–15n could be traditional inline or lookaside with respect to the interconnect, as well as inclusive or non-inclusive of their respective L1 caches 12a–12n. L2 caches 15a–15n can typically store a much larger amount of data than L1 caches 12a–12n, but with a longer access latency. For example, L2 caches 15a–15n may have a storage capacity of four megabytes and an access latency of 20 cycles, while L1 caches 12a–12n may have a storage capacity of 32 kilobytes with an access latency of two cycles.

As illustrated, data processing system 8 further includes input/output (I/O) devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Non-volatile storage 22 stores an operating system and other software, which are loaded into volatile system memory 18 in response to data processing system 8 being powered on. Of course, those skilled in the art will appreciate that data processing system 8 can include many additional components which are not shown in FIG. 1, such as serial and parallel ports for connection to network or attached devices, a memory controller that regulates access to system memory 18, etc.

Interconnect (system bus) 16, which can comprise one or more buses or a cross-point switch, serves as a conduit for communication transactions between processors 10a–10n, system memory 18, I/O devices 20, and nonvolatile storage 22. A typical communication transaction on interconnect 16 includes a source tag indicating the source of the transaction, a destination tag specifying the intended recipient of the transaction, an address, and data. Each device coupled to interconnect 16 preferably snoops all communication transactions on interconnect 16.

The execution circuitry of processors 10a–10n each comprises multiple execution units, including two fixed-point units (FXU), two load/store units (LSU), and two floating-point units (FPU). As is well-known to those skilled in the computer art, each of the execution units typically executes one or more instructions of a particular type of instructions during each processor cycle.

As its name implies, LSU typically executes load and store instructions which either load data from L1 cache or memory (i.e., either L2 data cache 15a . . . 15n, L3 cache, or main memory) into selected general purpose registers (GPRs), GPR rename buffers, fixed purpose registers (FPRs) or FPR rename buffers, etc., or which store data from a selected one of GPRs, GPR rename buffers, FPRs, or FPR rename buffers, etc., to memory. In one implementation, the present invention extends the functionality of the LSU during loading of data to allow preference ordering of the retrieval and/or transmitting of data.

Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory. Additionally, caches may be instruction, operand or data caches.

Although the invention is being described with reference to the above mentioned data processing systems, this references is in no way meant to be limiting on the invention. Other system types and architecture may be utilized in implementing the invention. For example, although FIG. 1 depicts only two levels of cache, the memory hierarchy of data processing system could be expanded to include additional levels (L3, L4, etc.) of serially-connected (or parallel) caches. This configuration will be described with reference to FIGS. 4A and 4B below. Finally, other embodiments may provide that any level cache consist of a single cache, for example, a single L2 cache may be utilized within the data processing system, accessible to a number (cluster) of the processors simultaneously. A simple L1 internal and L2 external cache topography is utilized herein in most illustrations for simplicity.

Also, it is important to note that the various embodiments presented herein specifically refer to retrieval of "data" from caches. The more general implementation of the invention covers all types of caches as well as other system components including memory and I/O devices from which "data" may be obtained. The term data is utilized herein to refer to the traditional data types as well as operands and instructions, etc.

In some SMP systems, CPUs have a shared system address/control bus which is separate from a shared system data bus. Thus system bus is divided into an address bus for transmitting address/read requests from the processors or other caches to the system via snoop broadcast, and data buses, which transmit the data from the caches to the processor. Data bus is larger than the system address/control bus as it carries larger amounts of information, thus requiring larger bandwidth. These buses connect to the memory/L3 controller which in turn is coupled to the L3 directory address/control bus, the L3 directory data bus, the L3 data array address/control bus, and the L3 data array data bus. Additionally, an L3 directory interfaces to the L3 directory address/control bus and data bus. The memory/L3 controller is connected to a main memory address/control bus and data bus which interface to main memory cards. The controller is further connected to I/O subsystem by an input/output (I/O) bus.

The present invention provides a new method of preferentially ordering the retrieval and/or transmission of data from a system component such as a cache, memory, and I/Os. In the illustrative embodiments, the invention is presented as the requesting, retrieval and/or transmission of data from a cache line based on a preference, which may be controlled by the processor, cache, system bus usage monitor or other system components. Thus, in one embodiment, the processor dictates an order for the retrieval of data from a data cache line to improve system and/or component efficiency. According to the invention, a processor signals to a cache controller the preference of order it desires in a requested set of data from a cache line. The modified cache controller in turn retrieves the set of data from the cache line in a selected order and signals to the processor the order being utilized for the transmission of the requested data. Both signaling methods utilize a set of bits transmitted on the system bus (i.e., the address bus for data request and data bus for data transmission). The value of the set of bits indicate the order preference and actual order, respectively, and is set by the respective signaling component. Logic components in both the processor and cache controller are modified to receive and correctly interpret the order bits.

Alternate embodiments of the invention utilize either a modified read address/data request instruction set with bits dedicated to order preference, or a read address/data request instruction set with an appended bit field (i.e., without using separate set of bits). This embodiment may require some adjustment to the address bus to accommodate differences in required bandwidth for transmitting a larger read address/data request instruction.

Other embodiments utilize multi-preference order bits to permit the selection of an order from a larger group of possible orders. These and other distinct embodiments are described in greater details below. In each case, the preference order is primarily based on component and/or overall system optimization.

In one preferred embodiment, the processor determines, based on present system conditions (i.e., configuration, loading, instruction fetch, data fetch, etc.), the order in which it requires data it is about to request to be transmitted. The preference is then encoded into a preference order set, which is placed on the address bus during the read address operation. Each cache is designed with preference order identifying logic to interpret the preference order bits. The preference order logic is preferably a component part of the cache controller logic or memory controller logic. The preference order bits are made to override the I/O device or cache which may be configured to provide sequential/fixed ordering pre-set scheme in the absence of specific direction from the processor.

The invention may be implemented by creating a new instruction set architecture (ISA) by modifying or adjusting load requests/read addresses to include preference ordering bits, which are all settable by the processor, other components or software. Alternatively, bits may be appended to the already existing read addresses. Depending on the desires of the system designer, either of these improvements may be made to implement the invention.

Figures 2A, 2B:
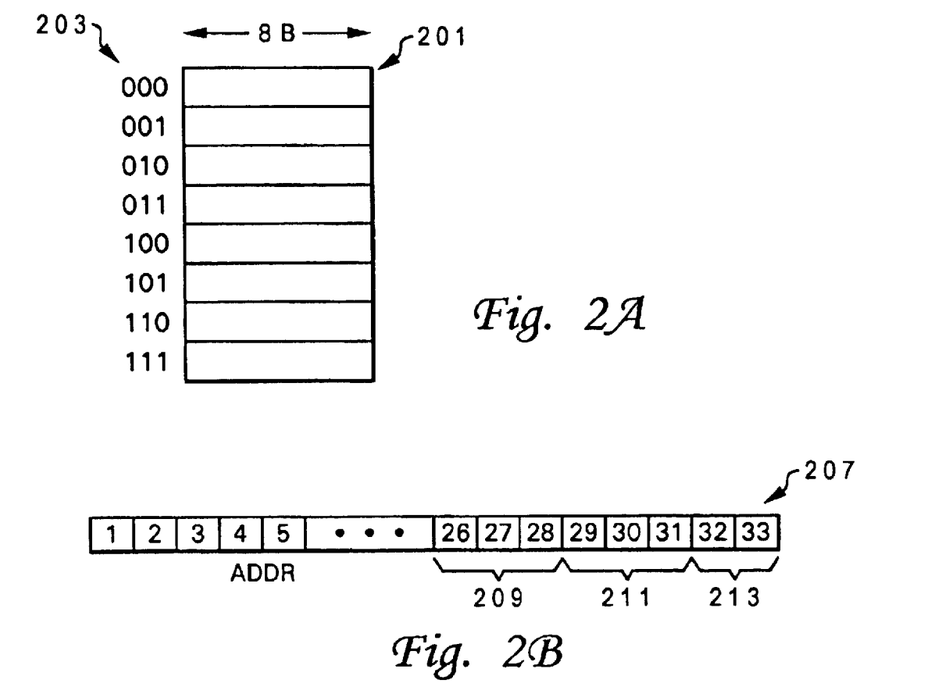
FIG. 2A is a block diagram of a 64 byte configured data cache line as may be utilized with one embodiment of the present invention.
FIG. 2B is a block diagram of a load instruction (i.e., load request/read address) utilized in accordance with a preferred embodiment of the present invention.

FIG. 2A depicts a 64 byte cache line-as represented in hardware. Each partial line 201 represents a beat. The beats are illustrated as numbered from 0 through 7 (binary 000-111) 203.

A modified read address is illustrated in FIG. 2B. The appending of preference ordering bits results in a larger read address necessitating a wider address bus to maintain propagation speeds. Read address 207 is comprised of 34 bit fields. The first 32 bit fields labeled 0 through 31 are the fields available in current instruction set architecture. Of the 32 bit fields, the first 26 are utilized as traditional addressing fields. Bit fields 26 through 31 contain the actual cache line address information. Fields 26–28 209 hold the cache line address while fields 29–31 211 indicate a specific beat in the cache line in which the critical data is stored. Bits 32 and 33 are added to the instruction set architecture to implement the invention. Both bits together represent a two-bit preference order set 213.

Figure 2C:
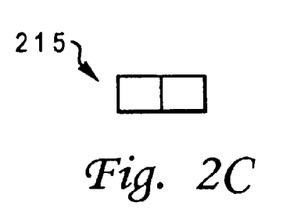
FIG. 2C is a block diagram of a two-bit preference order set utilized in accordance with a preferred embodiment of the present invention.
Figure 2D:
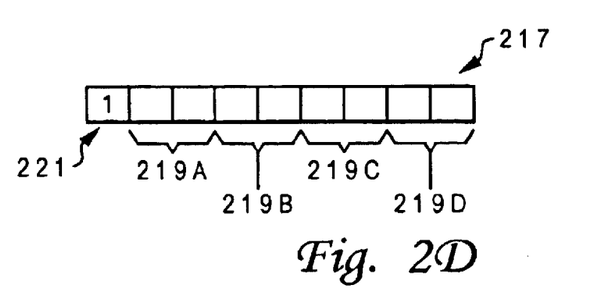
FIG. 2D is a block diagram of a nine-bit multi-preference order hint bit set utilized in accordance with a preferred embodiment of the present invention.

One preferred implementation of the invention utilizes a new instruction set, which is referred to herein as the preference order instruction bit set and/or multi-preference order instruction bit set on the address bus and selected order bit set on the data bus. FIGS. 2C and 2D illustrate both a two-bit single preference order set 215 and a multi-preference order set 217. In the multi-preference order set, more than one preference order can be encoded and transmitted to the cache controller. Each set represents a particular preference order and the sets are given different priorities. Thus, four two-bit sets 219A, 219B, 219C, and 219D are illustrated, with a control bit 221 set to 1 to indicate to the cache controller that the priority order runs from left to right. Thus, the order preference defined by the leftmost set 219A is most desired. If the cache is unable to provide the data in that order, then the next highest priority order 219B is desired. The multi-preference order set is also utilized in one embodiment of a vertical cache configuration described below.

Figure 2E:
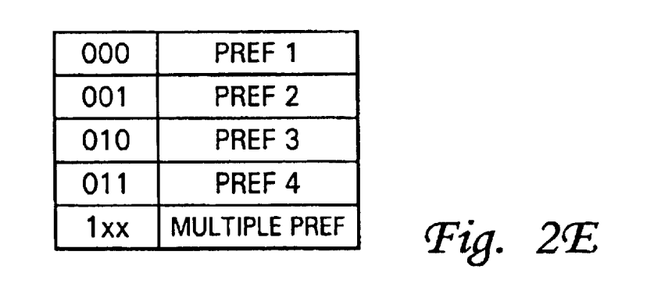
FIG. 2E is a table of four preference orders utilized in a preferred embodiment of the present invention.

FIG. 2E illustrates a table with different priority values based on the last two bits directly related to a particular ordering preferred. Thus a preference order set with 00 indicates a first preference, while a bit set with 11 indicates a fourth preference. The use of arbitrary bit values to indicate the preference orders assumes that the logic components of the processor and cache are able to interpret the bits to represent specific orders known by both components.

Figure 4A:
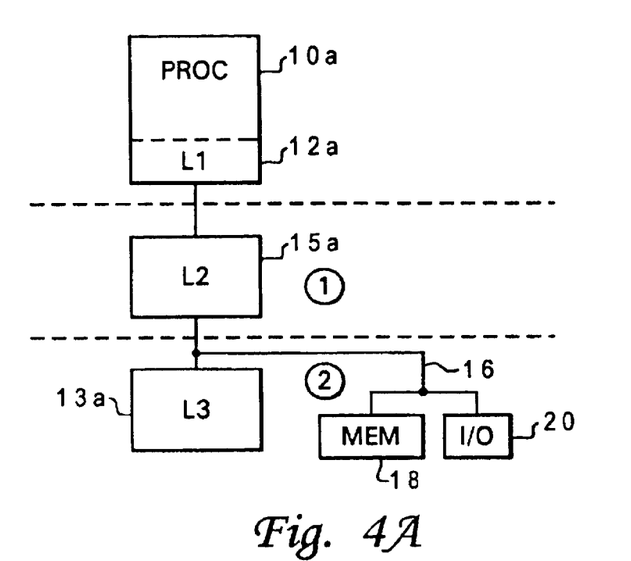
FIG. 4 is a block diagram illustrating a vertical cache configuration according to one embodiment of the present invention.
Figure 4B:
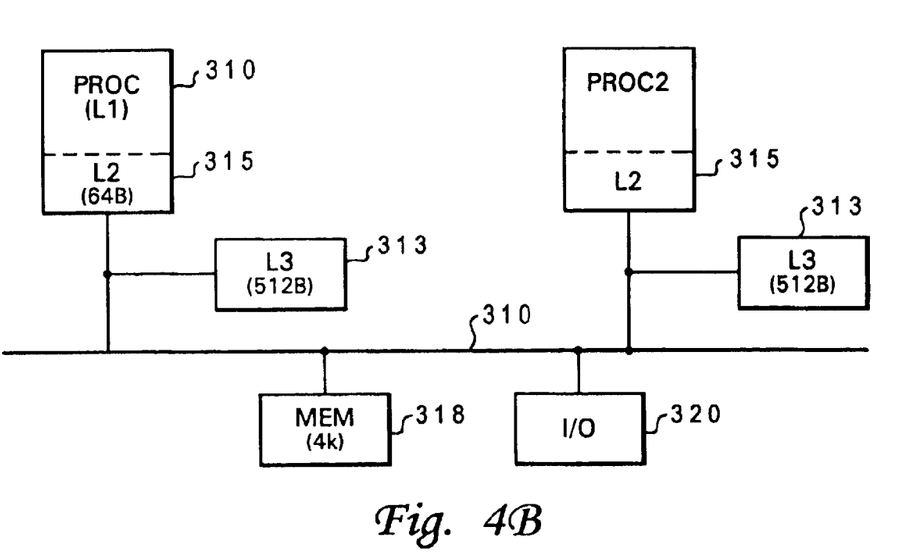

The present invention may be executed in a variety of cache configurations. The cache memory may include, for example, a primary cache (L1), a secondary (L2) or a tertiary cache (L3). One embodiment of the invention occurs in a vertical cache configured processor as illustrated in FIGS. 4A and 4B. FIG. 4A depicts a processor 10*a* having on-chip L1 cache 12*a*. Also depicted are vertical caches, L2 15*a* and L3 13*a*. Other components, memory 18 and I/O 20 are also illustrated coupled via system bus 16. The levels 1 and 2 have been delineated by hashed lines corresponding to a configurable location of L2 15*a* and L3 13*a* respectively.

FIG. 4B depicts a somewhat different vertical cache configuration with similar components as FIG. 4A. Illustrated are the processor 310 along vertical caches L2 315, and L3 313. L2 cache 315 is on-chip. Each cache is illustrated having a preferred cache line width. For example, L2 315 is illustrated having a 64 byte cache line, while L3 313 is illustrated having a 512 byte cache line. Additionally, I/O 320 and memory 318 are connected to system bus 310 with memory 318 having four kilobyte cache lines.

With vertical caches, the preference is different than on system bus configuration. There are different preferences at different vertical levels. The processor does not know at which level the hit will occur, so it optimizes by setting the preference order set to the cache at which most hits occur.

Unlike the other non-vertical cache embodiments in which the processor issues a preference bit set indicating a single preferred order corresponding to the processor preference, the preferences of the processor are directly correlated to the particular cache at which the processor expects a hit. Each of the caches L2 and L3 may have alternative preferences which maximizes the efficiency of the cache line retrieval process for the processor.

Utilizing a multiple-preference ordering bit set, the number of sets of preference bits is matched with the number of vertical caches. Each set is then encoded according to the processor preference order for the related cache. The order preference may be based on cache size, cache line size, connector/bus bandwidth, etc. Hence, a first preference set is encoded for L2, a second set for L3, and so on. The preference order sets are sent to L2 along with the read address. If the request misses at L2, then the address and preference order sets are sent to L3. A miss at L3 results in the third preference order sets being sent to the system bus. Accordingly, each cache is awarded its own set of preference bits and can adjustably order the data in such a way as to maximize efficiency of data transmittal from that particular cache.

The above embodiment utilizes more than one preference order set. Another embodiment is provided whereby only one preference order set is required. In this vertical cache embodiment, the load address is provided a preference order set which may be created by a higher level cache.

In the preferred vertical cache embodiment, each cache controller carries out several processes in the implementation of the invention. In this embodiment, one preference order set is issued by the processor for the L2 cache. The L2 cache controller determines if a hit or miss occurs. If a hit occurs, then the desired order is utilized within the order preference evaluation as described above. If a miss occurs, however, then L2 cache controller creates the preference order set to the order preference for the L3 cache prior to sending the address and preference bits down the line. The lower level cache preference order may be included in the upper level cache logic. The same process occurs at L3 cache controller to lower level vertical caches, until either there are no more vertical caches or a hit occurs.

In one embodiment, a prioritization of preference ordering occurs, where, for example., the processor may require data in a particular order while other system components, such as the cache or system bus, may each have different ordering preferences. The prioritization scheme is implemented utilizing logic components included in the modified cache controller to determine which preference will actually be granted. Typically this equates to that preference which also leads to best overall system performance.

Figure 3:
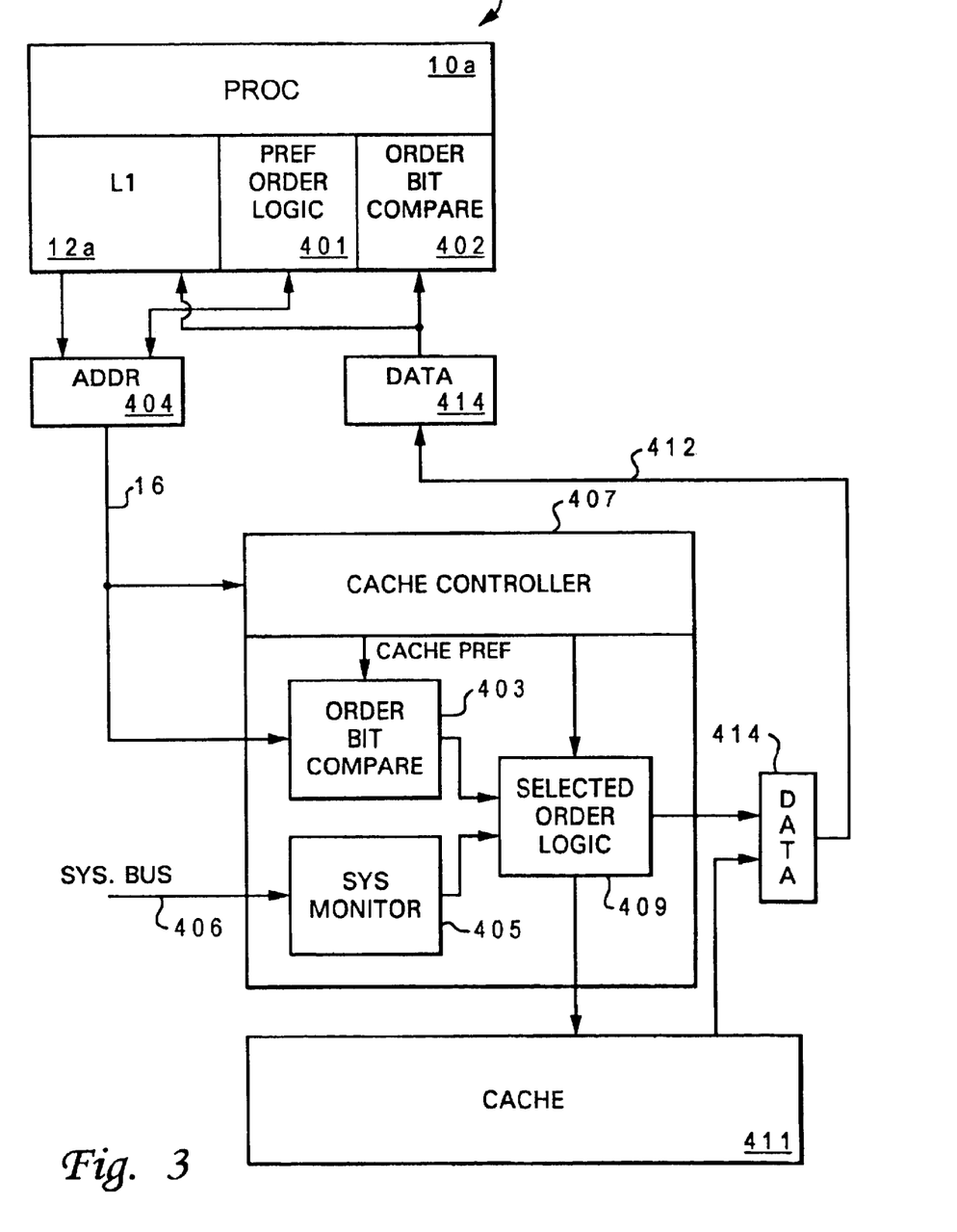
FIG. 3 depicts a detailed block diagram of a cache unit and associated modified cache controller utilized in accordance with a preferred embodiment of the present invention.

Regardless of the cache architecture being utilized, the critical path for address translation still includes a translation lookaside buffer, a directory or tag array, and a group of comparison circuits, which must be utilized during a cache access to select an appropriate cache line within the cache memory. FIG. 3 illustrates one embodiment of a modified processor and cache controller in which the various steps of the invention occur. Depicted are processor 10a along with L1 cache 12a on a processor chip 1. Also on processor chip 1 are preferred order logic 401 and order bit compare logic 402. Preferred order logic 401 determines the processor preference and generates the preference order bits values. Order bit compare logic 402 intercepts and interprets the selected order signal bits for processor 10a. Processor 10a is coupled to L1 cache 12a which in turn generates the snoop requests sent out on system bus 16. Snoop requests are sent via system bus as read addresses 404 which have preference order bits either appended or placed ahead of them on system bus 16. Cache controller 407, which controls the various processes involved in retrieving and storing data to cache 411, receives read address and generates its own cache order preference which it sends to cache order bit compare logic 403. Cache order bit compare logic 403 is similar to order bit compare logic 402 of processor and both complete similar functions. Cache order bit compare logic 403 also receives preference order bits of the processor. Cache order bit compare logic 403 operates as a comparator and prioritizes the preference order requests of the processor 10a and cache controller 407. Located within cache controller 407 is a system monitor unit 405 which monitors the system bus for loading and system requirements. This information is transmitted to selected order logic 409 and utilized in preference ordering decisions. Selected order logic 409 also receives the results from the cache order bit compare logic 403 and determines the order of retrieval of the data base on a prioritization of both inputs. Once the determination is complete, data is retrieved from the cache 411 according to selected order. Selected order logic 409 transmits the selected order bits to the processor 10a along with the data 414 via data bus 412. Once a selected order is chosen, the cache 411 is sent the order preference followed by the required information from the read address. Data is then transmitted back to processor 10a via data bus 412 in the selected order. The data 414 is received at the L1 cache 12a and the order bit compare logic 402 intercepts and decodes the selected order which is sent to the processor. Other components or configurations are possible and those skilled in the art recognize that any other such configurations which effect the features of the invention are covered.

When the data is transmitted back, the source (i.e., the cache), places a selected order signal with the data on the data bus. The selected order signal serves primarily to inform the requesting processor of the actual order in which the requested data is being transmitted. The processor logic unit intercepts and interprets the selected order signal. The signal may be a single bit which merely informs the processor whether or not its requested order preference was honored. Alternatively, the signal may be multi-bit which provides specific ordering information. Selected order signal allows the arbiters and other resources within the processor to more opportunistically prepare for delivery of load data. The processor may then reserve its pipeline and other resources for the data in the order desired.

In one preferred embodiment, which implements a multi-preference ordering scheme, a three bit field is utilized as the selected order signal. The cache controller sets the bits to reflect the order in which the data is being transmitted. FIG. 2B indicates possible variations in the representation of the bit fields. Eight possible variations are illustrated ranging from 000 to 111. For example, 000 may represent that the processor preference was honored, 001 may indicate that a fixed order preference (which may be a secondary processor preference) was selected, 011 may provide an indication that the third preference, which may be sequential ordering, for example, is selected. Note that when the bit field contains 000, the processor is signaled that the requested preference is provided and the data is ordered according to that preference (i.e., the actual preference/selected order is not separately provided). However, a 111 (not shown) may indicate a cache preference based on the cache controller logic or system bus optimization. The actual order is unknown to the processor. Additional bits may thus be transmitted with the actual order selected or as described below. Upon interception of the bits by the logic, the processor's data controller configures the registers to receive the data based on the order indicated by the data control bits.

In another three bit selected order signal embodiment, the first bit is utilized to alert the processor whether the order conforms to the processor preference or preference of another component. The next two bits are then encoded with the order selected. Thus, when the selected order bits begin with a 1, the processor may be alerted that cache or system bus preferences have been utilized (i.e. the processor requested preferences were not honored). The selected order bits are encoded prior to transmission of retrieved data and transmitted ahead of the data.

In yet another related embodiment, the system dynamically changes the preference order utilized, based on the current bus utilizations (or loading). The system bus utilization is monitored by various hardware components, which provide feedback to the cache controller. In the preferred embodiment, the processor is also provided feedback of the system bus usage in determining its preference order. However, the selected order signal is based primarily on the feedback to the cache controller as the processor may still require an order which is not ideal for the system bus. A trade-off of latency versus data bandwidth is calculated and instituted. The cache providing the data monitors the system bus and if it is heavily utilized, then the order is optimized for data bandwidth, (i.e., ensuring no bubbles or dead cycles on the data bus). If, however, the system bus is lightly utilized, then the order is optimized for data latency (i.e., some dead cycles may occur on data bus).

Figure 5:
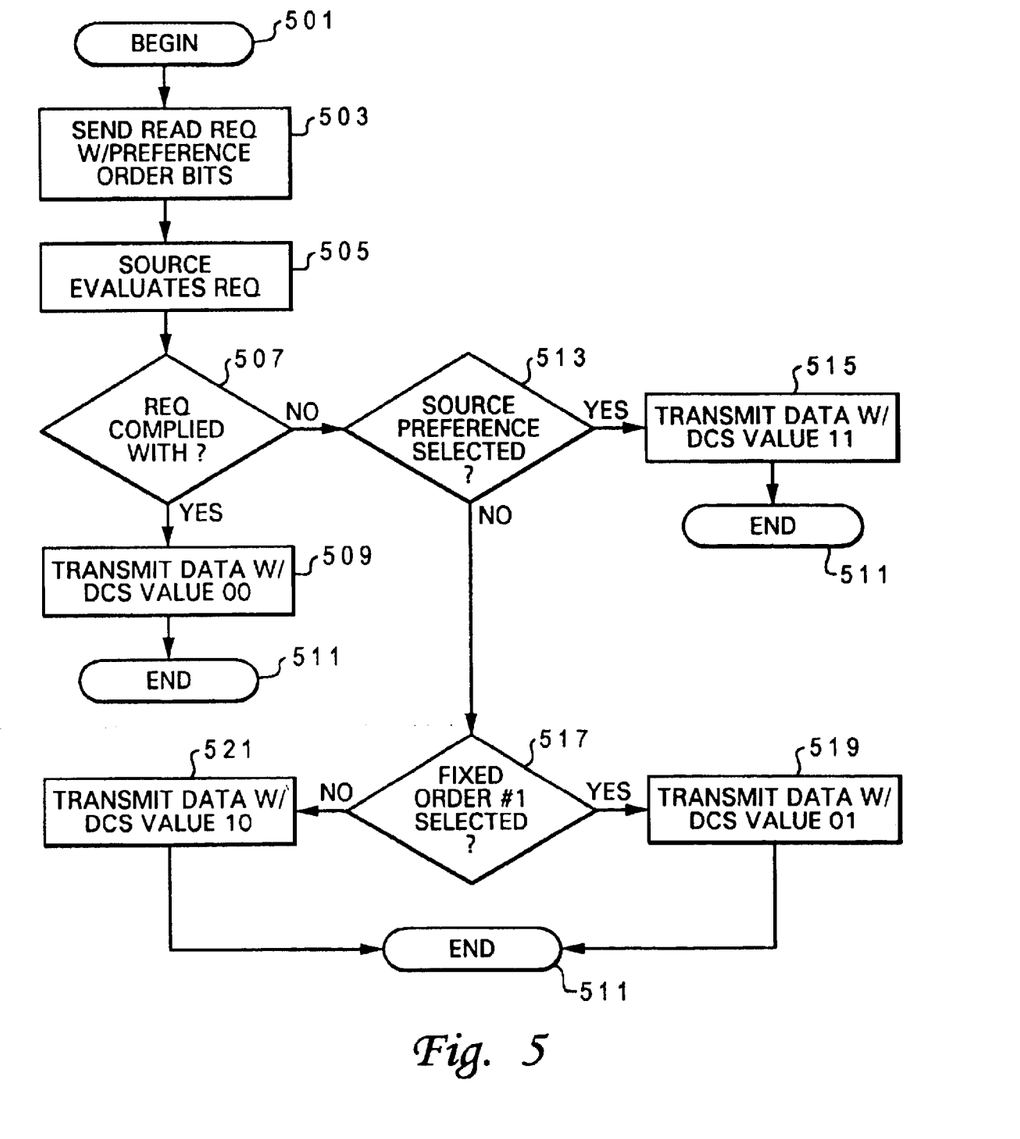
FIG. 5 depicts a logic flow chart of the process of requesting and transmitting data with a multi-preference ordering hint bit set in accordance with one embodiment of the present invention.

FIG. 5 illustrates the process of ordering data utilizing two-bit multi-preference ordering bit set. In this embodiment, four different ordering states are possible and are represented by selected order bits 00,01,10, and 11, respectively. After the process begins (step 501), a read address is transmitted with preference ordered bit set on the system bus (step 503). The cache controller evaluates the requested preference (step 505). A check is then made to determine if the requested preference will be honored (step 507). If the preference is honored, then the data is transmitted with selected order signal bits indicating this (step 509). Then, the process ends (step 511).

If, however, the requested preference is not honored, another check is made to determine if the cache preference is being selected (step 513). If the cache preference is selected, then the data is transmitted with the selected order bits indicating this (step 515). If, however, the cache preference is not selected, then another check is made to determine which of the two optional preferences were selected (step 517). If a first optional preference was selected, the data is transmitted with the selected order bits indicating this (step 519), otherwise the data is transmitted with selected order bits indicating the second preference order (step 521). Then the process ends (step 511). The transmission of the selected order bits occurs prior to the data in each scenario.

Those skilled in the art will appreciate that a variety of process steps are possible when searching external system components and that only one is presented herein for simplicity and brevity. For example, no limit exists on the levels of caches available to a processor. The invention is easily extended to cover processors with level 3 (L3), level 4 (L4) and other lower level caches. Also, although FIG. 5 illustrates numerous steps in a sequential fashion for the sake of simplicity, those skilled in the art will appreciate that many of the operations to which the steps pertain may actually be performed in parallel or in a different order.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While an illustrative embodiment has been particularly shown and described, it will be understood by those skilled in the art that various changes in form and detail may be made therein without departing from the spirit and scope of the illustrative embodiment.

What is claimed is:

1. A system for informing a processor of an order for transmittal of data from a cache line of a cache, said system comprising:

means for coupling said cache to said processor unit to effectuate data transfer, means for receiving at said cache a preference of ordering data retrieval for a read request issued from said processor, wherein said preference of ordering data retrieval is represented by a hierarchical sequence of preference of ordering data retrieval issued from said processor;

means for determining an order in which to transmit said data from a cache line of said cache by evaluating said hierarchical sequence of preference of ordering and comparing said hierarchical sequence of preference of ordering with a cache preference of ordering, wherein said hierarchical sequence is evaluated to determine if a highest preference may be honored, and if said highest preference cannot be honored, a next highest preference available is selected and said data is issued according to the highest preference available; and means for issuing to said coupling means a selected order bit set ahead of said data, wherein said selected order bit set informs said processor unit of a selected order for data retrieval and said is data is transmitted in said selected order.

2. The system of claim 1, wherein said issuing means further comprises:

means for setting said selected order bit set to reflect said order; and means for sending said selected order bit set ahead of said data, wherein a system bus data transfer mechanism is modified to transmit said selected order bits prior to said data, and wherein said processor unit is designed to recognize and interpret said selected order bit set to accurately determine the order of data transmittal.

3. The system of claim 2, further including means for intercepting said selected order bit set and notifying said processor unit of said order prior to an arrival of said data.

4. The system of claim 1, wherein said determining means is software controlled, wherein a program instruction dynamically determines a preference of ordering data retrieval and sets said selected order bit set during execution of a program.

* * * * *